(12) United States Patent
Strack

(10) Patent No.: US 9,337,765 B2
(45) Date of Patent: May 10, 2016

(54) METHOD FOR OPERATING AN ELECTRICAL MACHINE

(71) Applicant: SIEMENS AKTIENGESELLSCHAFT, München (DE)

(72) Inventor: Sebastian Strack, Düsseldorf (DE)

(73) Assignee: SIEMENS AKTIENGESELLSCHAFT (DE)

( * ) Notice: Subject to any disclaimer, the term of this patent is extended or adjusted under 35 U.S.C. 154(b) by 85 days.

(21) Appl. No.: 14/379,907

(22) PCT Filed: Jan. 15, 2013

(86) PCT No.: PCT/EP2013/050613
§ 371 (c)(1),
(2) Date: Aug. 20, 2014

(87) PCT Pub. No.: WO2013/127554
PCT Pub. Date: Sep. 6, 2013

(65) Prior Publication Data
US 2015/0022132 A1    Jan. 22, 2015

(30) Foreign Application Priority Data
Mar. 1, 2012 (EP) .................................... 12157620

(51) Int. Cl.
*H02P 7/00* (2006.01)
*H02P 23/00* (2016.01)
(Continued)

(52) U.S. Cl.
CPC .......... *H02P 23/0077* (2013.01); *H02K 11/001* (2013.01); *H02K 11/0015* (2013.01);
(Continued)

(58) Field of Classification Search
CPC .......... H02P 7/34; H02P 9/00; Y02T 10/7077
USPC .......................................... 318/140, 629, 632
See application file for complete search history.

(56) References Cited

U.S. PATENT DOCUMENTS

| 4,437,163 | A | * | 3/1984 | Kurihara | .................. G07C 3/00 702/56 |
| 4,607,529 | A | * | 8/1986 | Morey | .................. G01N 29/12 73/660 |

(Continued)

OTHER PUBLICATIONS

European Search Report, dated Oct. 19, 2012, issued in corresponding European Patent Application No. EP12157620.1. Total 5 pages.
(Continued)

*Primary Examiner* — Rina Duda
(74) *Attorney, Agent, or Firm* — Ostrolenk Faber LLP

(57) ABSTRACT

A method for operating an electrical machine having a stator 1 with a coil from electrical conductors, which has two coil ends 2 lying opposite each other. The method includes simultaneously recording vibration measurements by means of which the elliptic vibration modes of the two coil ends 2 can be determined as a factor of time; determining the ellipse inclinations and the phase positions of elliptic vibration modes of the two coil ends 2; determining critical operating states of the electrical machine, in which the elliptic inclinations and the phase positions of the elliptic vibration modes of the two coil ends are substantially identical; and operating the electrical machine in such a manner that the critical operating states can be avoided by varying the idle power of the electrical machine.

12 Claims, 2 Drawing Sheets

(51) Int. Cl.
*H02K 11/00* (2016.01)
*H02P 9/00* (2006.01)
*H02P 9/14* (2006.01)
*G01H 1/00* (2006.01)
*H02K 3/50* (2006.01)

(52) U.S. Cl.
CPC  *H02P9/006* (2013.01); *H02P 9/14* (2013.01); *G01H 1/003* (2013.01); *H02K 3/505* (2013.01); *Y02E 20/16* (2013.01)

(56) References Cited

U.S. PATENT DOCUMENTS

| | | | |
|---|---|---|---|
| 5,469,745 A | 11/1995 | Twerdochlib | 73/660 |
| 5,533,400 A * | 7/1996 | Gasch | G01H 1/003 73/593 |
| 6,705,168 B2 * | 3/2004 | Poizat | G01N 29/14 73/579 |
| 2010/0039075 A1 * | 2/2010 | Trainer | H02P 9/04 322/58 |
| 2010/0066315 A1 | 3/2010 | Diatzikis | 322/99 |

OTHER PUBLICATIONS

John Demcko, et al., "New Tools to Monitor Critical Vibration of End-Windings in Turbo-Generators", Electric Machines & Drives Conference (2007) IEMDC '07, IEEE International, Piscataway, NJ. pp. 1020-1024.

International Search Report dated Dec. 9, 2013 issued in corresponding International patent application No. PCT/EP2013/050613.

* cited by examiner

METHOD FOR OPERATING AN ELECTRICAL MACHINE

CROSS-REFERENCE TO RELATED APPLICATIONS

The present application is a 35 U.S.C. §§371 national phase conversion of PCT/EP2013/050613, filed Jan. 15, 2013, which claims priority of European Patent Application No. 12157620.1, filed Mar. 1, 2012, the contents of which are incorporated by reference herein. The PCT International Application was published in the German language.

TECHNICAL FIELD

The invention relates to a method for operating an electrical machine.

TECHNICAL BACKGROUND

In a gas power plant or a gas and steam combination power plant, an electrical generator is driven by means of a gas turbine or a steam turbine for the purpose of generating electrical energy. The waste heat that is produced in the gas turbine is used in the combination power plant for the purpose of driving a steam turbine and said steam turbine can drive a further electrical generator. The generators comprise in each case a stator and a rotor, wherein the rotor is coupled to a shaft of the respective turbine and said rotor comprises an exciter coil or permanent magnets. The stator comprises a coil of electrical conductors and said coil comprises a coil end in each case on the two axial ends of the stator.

As a result of the increased use of renewable energy sources, such as, for example wind power or solar power, it is increasingly necessary for the power plant to equalize energy fluctuations from the renewable energy sources. For this purpose, the power plant frequently changes its operating mode in order to deliver different magnitudes of output at different points in time. This has the consequence that the components of the power plant are exposed to a high load and consequently are subjected to a high level of wear and tear. In particular, the coil ends of the generator are subjected to different wear and tear processes, such as vibration as a result of the current forces that are produced in the generator or by means of a vibration of the rotor.

SUMMARY OF THE INVENTION

The object of the invention is to provide a method for operating an electrical machine having a stator and a rotor, wherein the coil ends of the stator have a long service life.

The method in accordance with the invention is for operating an electrical machine comprising a stator having a coil of electrical conductors, wherein the coil comprises two coil ends that lie opposite one another. The method is implemented as described herein and comprises: simultaneously determining vibration measurement values by means of which the elliptic vibration modes of the two coil ends can be determined in dependence upon time; determining the ellipse inclinations and the phase positions of the elliptic vibration modes of the two coil ends; determining critical operating states of the electrical machine in which the ellipse inclinations and the phase positions of the elliptic vibration modes of the two coil ends are essentially identical; and operating the electrical machine in such a manner that the critical operating states can be avoided by varying the idle power of the electrical machine.

It is possible for the electrical machine to be either a synchronous motor or a generator. The vibration of the coil is a forced vibration that occurs as a result of periodic excitation. The movements that the coil ends perform are described as operating vibration forms. As a result of the periodic excitation, the operating vibration forms are not unconditionally characteristic of the coil ends. The operating vibration forms of the coil ends occur as a result of a superposition of different operating vibration modes. In accordance with the invention, the vibration measurement values are processed in such a manner that the elliptic vibration modes are extracted from the different operating vibration modes. In a bipolar generator, the elliptic vibration mode is the dominant operating vibration mode, in other words, the operating vibration mode that makes the greatest contribution to the wear and tear on the coil ends. The elliptic vibration modes are in each case characterized by means of a vibration frequency and by means of ellipse inclinations, in other words the position of the axis of the ellipses in space. In the case of bipolar generators, the vibration frequency of the elliptic vibration mode amounts to twice the network frequency, in particular 100 Hz in the case of 50 Hz generators or 120 Hz in the case of 60 Hz generators. If the corresponding axes of the ellipses of the two coil ends are offset by 90°, the vibration is therefore non-critical. In the case of some operating states, the two elliptic vibration modes comprise essentially the identical ellipse inclination and the identical phase position. If this is the case, the coil ends are thus subject to a high mechanical load as a result of the superimposition of excitation force vectors from two different excitation mechanisms, namely an elliptic distortion of the lamination stack of the electrical machine and from current forces that act upon the coil ends. Because the critical operating states are identified, it is possible to avoid the critical operating states by varying the idle power of the machine, whereby the electrical machine has a long service life.

The variation of the idle power can be caused by an increase or a reduction in the exciting current. The exciting current flows through an exciter coil and generates a temporally constant magnetic field in the electrical machine. If the electrical machine is a generator, the operator of the generator can likewise control a variation of the idle power consumption or rather the idle power output with a load distributor. For example, a reduction in the idle power can be compensated for by means of an increase in the idle power by means of another generator.

It is preferred that the vibration measurement values of the coil ends be determined at at least eight and at a maximum twelve measuring points that are uniformly distributed along the circumference of each of the coil ends and are arranged in each case in the same axial position.

It is preferred that the stator comprises a lamination stack. Then the method comprises the following steps: determining vibration measurement values with which the elliptic vibration mode of the lamination stack can be determined in dependence upon time and simultaneously determining the vibration measurement values with which the elliptic vibration modes of the two coil ends can be determined; determining further critical operating states of the electrical machine in which the ellipse inclinations and the phase positions of the elliptic vibration modes of the lamination stack and at least one of the coil ends are essentially identical; operating the electrical machine in such a manner that the further critical operating states are avoided by varying the idle power. The vibration of the coil ends is a result of different excitation mechanisms. An analysis regarding the different excitation mechanisms is advantageously possible by virtue of the fact that the vibration is absorbed by both the coil ends and also the coil core. The different excitation mechanisms can be the current forces acting upon the coil ends and an elliptical distortion of the coil core. The further critical operating states arise by virtue of the fact that the two excitation mechanisms run in a synchronized manner and the further critical operating states are advantageously avoided by the preferred embodiment of the method.

It is preferred that the vibration measurement values of the lamination stack be determined at one axial position that lies in the center between the two coil ends. In this position, the vibration of the lamination stack is advantageously mildly influenced by the excitation mechanism that is produced by the current forces that are acting upon the coil ends and therefore essentially reflects the elliptical distortion of the lamination stack. The vibration measurement values of the lamination stack are preferably determined at at least eight and at a maximum twelve measuring points that are uniformly distributed along the circumference of the coil core and are arranged in the same axial position.

The method preferably comprises the following steps: determining the pole wheel angle and the phase angle of the electrical machine; creating a characteristic field in which the critical and the further critical operating states of the electrical machine are plotted in dependence upon the pole wheel angle and the phase angle, and avoiding the operating states with reference to the characteristic field. An operating state of the electrical machine is in particular characterized by the pole wheel angle and the phase angle. The pole wheel angle is a measurement for the load state of the electrical machine, the phase angle describes the phase difference between the electrical voltage and the electrical current of the electrical machine and is a measurement of the idle power.

For the purpose of determining the elliptic vibration modes, the method preferably comprises the steps of: transforming the vibration measurement values into a frequency spectrum. This is a Fourier transformation. After the Fourier transformation, the elliptic vibration modes can be advantageously separated from the remaining vibration modes in a simple manner.

It is preferred that the vibration measurement values be displacements, speeds and/or accelerations of the measurement points. For example, the accelerations can be recorded using fiber optic acceleration sensors. Likewise, the accelerations can be measured with the aid of piezoelectric crystals. However, other measurement methods such as measurement methods based on ultrasound or radar or by means of inductive gap sensors are also feasible.

The displacements that occur in the radial direction, the speeds that occur in the radial direction and/or the accelerations that occur in the radial direction are preferably determined. The forces that cause the vibrations occur mostly in the radial direction so that a deformation of the stator mostly occurs likewise in the radial direction.

The critical operating states and/or the further critical operating states are preferably avoided by means of varying the effective power. As a consequence, a second degree of freedom is advantageously achieved in addition to the idle power and said degree of freedom can be varied in such a manner that the critical operating states are avoided. Accordingly, a greater flexibility is achieved in the case of operating the electrical machine.

BRIEF DESCRIPTION OF THE DRAWINGS

The method in accordance with the invention is further explained hereinunder with reference to the attached drawings. In the drawings.

DESCRIPTION OF AN EMBODIMENT

Figure 1:
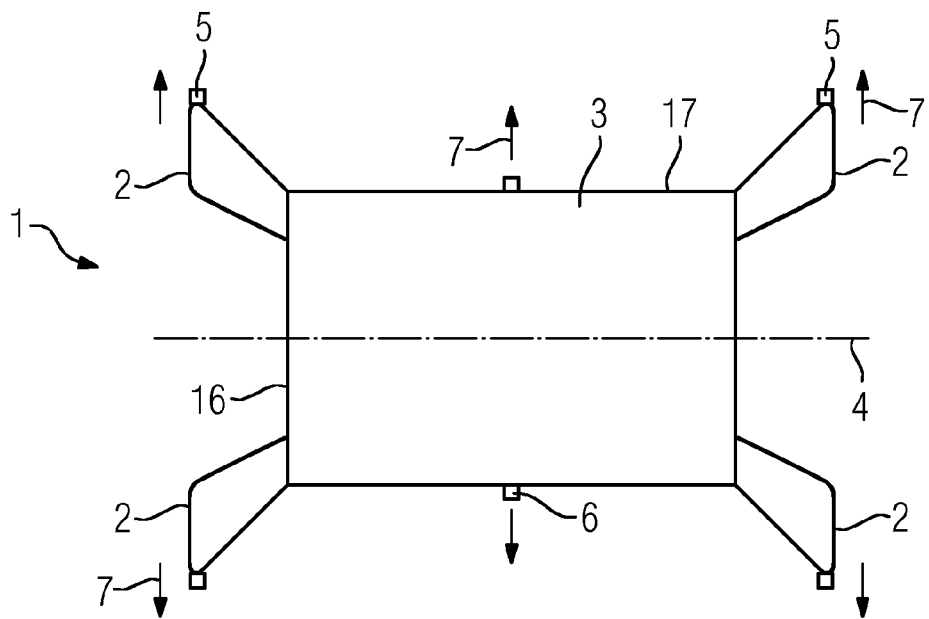
FIG. 1 illustrates a longitudinal section of a stator of an electrical machine and FIGS. 2 to 4 illustrate in each case an operating state of the electrical machine with reference in each case to a phasor diagram in the complex number plane and in each case two cross sections through the stator.

As is evident in FIG. 1, an electrical machine comprises a stator 1. The electrical machine likewise comprises a machine axis 4 and a rotor (not illustrated in FIG. 1) and said rotor rotates about the machine axis 4 during operation of the electrical machine. The stator 1 is arranged radially outside of the rotor and likewise symmetrically about the machine axis 4. The stator 1 comprises a coil of electrical conductors around a lamination stack 3, wherein the coil comprises in each case a coil end 2 on the two end faces 16 of the stator 1.

During operation of the electrical machine, forces occur at the stator 1 and said forces can cause vibrations of the stator 1. FIG. 1 illustrates in an exemplary manner different force vectors 7 that act upon different positions of the stator 1. Two force vectors 7 that are arranged lying opposite one another are illustrated on each of the two coil ends 2 and said force vectors are identical in terms of magnitude and in each case are aligned in the radial outwards direction. However, it is also feasible that the force vectors 7 of one coil end 2 are aligned radially outwards and the force vectors 7 of the other coil end 2 are aligned radially inwards. Two force vectors 7 that are likewise arranged opposite one another are likewise illustrated on the lamination stack 3 and in the center between the two coil ends 2 and said force vectors are identical in terms of magnitude and are aligned radially outwards. It is likewise possible that the force vectors are aligned radially towards the interior.

At least eight coil end vibration sensors 5 are arranged on the coil ends 2 uniformly distributed along the circumference for the purpose of recording the vibrations of the stator 1. Furthermore, likewise at least eight lamination stack vibration sensors 6 are arranged uniformly distributed along the circumference of the lamination stack 3 on the radial exterior face 17 of the lamination stack 3 in the center between the two end coils 2. As a result of providing in each case eight vibration sensors 5, 6, it is possible for the characteristic form of the vibration to be recorded in the respective axial position of the stator 1 with sufficient accuracy. It is also possible in principle to arrange lamination stack vibration sensors at further axial positions of the stator 1. The vibration sensors 5, 6 can record displacements, speeds and/or accelerations in dependence upon time. In accordance with the invention, the vibration sensors 5, 6 simultaneously record the vibration measurement values. It is preferred that in each case the displacements, speeds and/or accelerations that occur in the radial direction are recorded. From this data, it is then possible to reconstruct the operating vibration forms and the frequencies for the vibrations of the two coil ends 2 and the lamination stack 3 in the axial position in which the lamination stack vibration sensors 6 are arranged.

Figure 2:
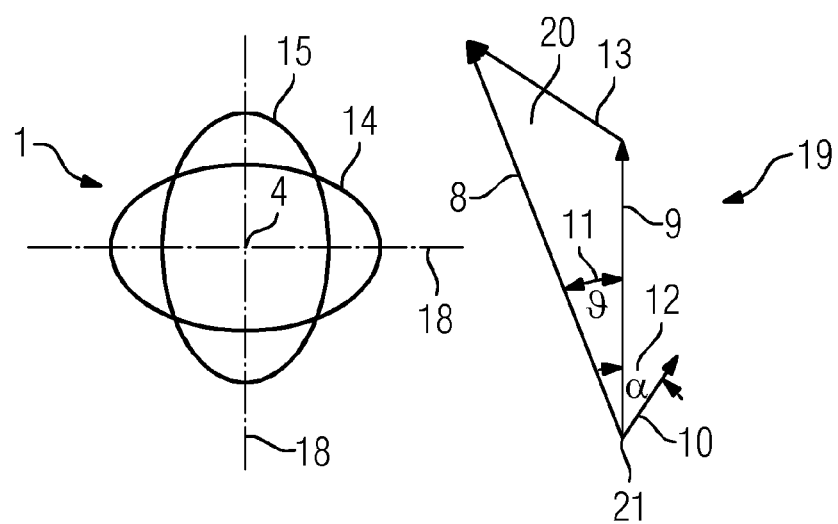
Figure 3:
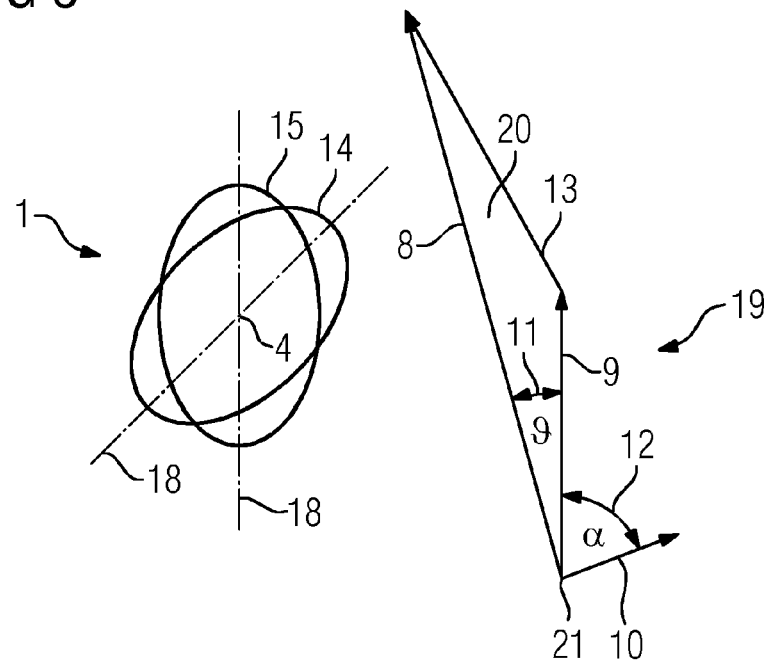
Figure 4:
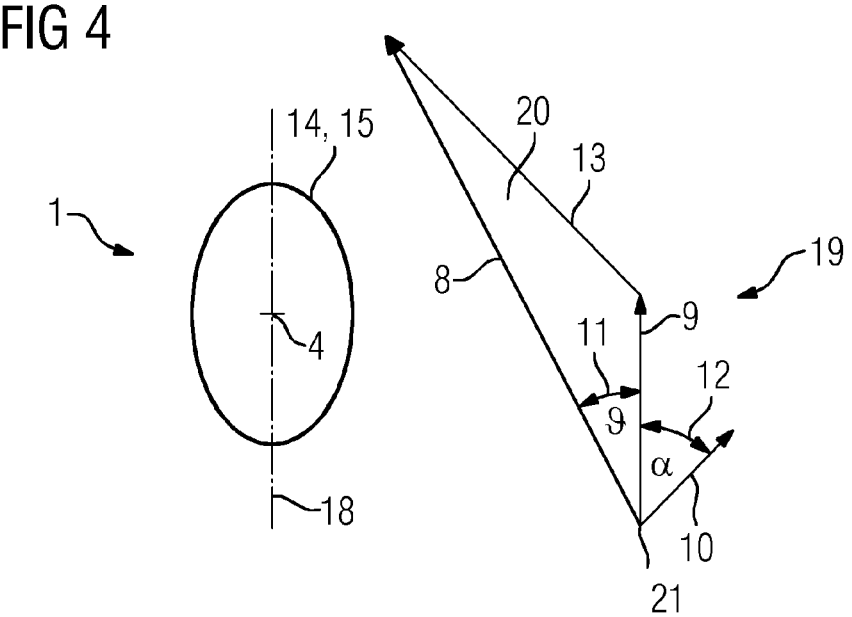

FIGS. 2 to 4 illustrate the vibrations of the stator 1 in the case of three different operating states of the electrical machine. The vibrations are characterized by virtue of the fact that during the course of the vibrations, the originally circular cross section of the stator 1 becomes elliptical. FIGS. 2 to 4 illustrate in each case a coil end cross section 14 through one of the two coil ends 2 and a lamination stack cross section 15 in the axial position in which, in FIG. 1, the lamination stack vibration sensors 6 are arranged. The cross sections 14, 15 are recorded at a point in time of the vibrations in which the cross sections 14, 15 are elliptical in FIGS. 2 to 4. The elliptical cross sections 14, 15 comprise in each case a main axis 18 and a center point that lies on the machine axis 4.

Each of the three operating states in FIGS. 2 to 4 is described by means of a phasor diagram 19. Each of the three operating states is characterized by means of a pole wheel voltage vector 8, a stator voltage vector 9 and a current vector 10 that in each case lie in a complex number plane 20 and are based on the origin 21 of the complex number plane 20. The phasor diagram 19 illustrates likewise in each case a reactance current product vector 13 that connects the peaks of the pole wheel voltage vector 8 and the stator voltage vector 9 to one another. The reactance current product vector 13 is the product of the reactance (idle resistance) and current.

A pole wheel angle 11 is embodied between the pole wheel voltage vector 8 and the stator voltage vector 9 and a phase angle 12 is embodied between the stator voltage vector 9 and the current vector. In the case of the electrical machine running idle, the pole wheel angle is zero. In the case that the electrical machine is in the generator mode, the pole wheel voltage vector 8 rotates before the stator voltage vector 9, in the case that the electrical machine is in its motor mode, the pole wheel voltage vector 8 rotates after the stator voltage vector 9. In FIGS. 2 to 4, the case of the generator mode is illustrated, with the pole wheel voltage vector 8 that is rotated clockwise in comparison to the stator voltage vector 9 and with a pole wheel angle 11 that is embodied as acute. The pole wheel angle 11 is a measurement for the effective power of the electrical machine. If the electrical machine delivers current to inductive or capacitive consumers, the phase angle 12 of zero assumes different values. In other words, the electrical current and the electrical voltage comprise phases that are displaced with respect to one another. The phase angle 12 is a measurement for the idle power of the electrical machine.

The three operating states in FIGS. 2 to 4 are in each case characterized by different pole wheel angles 11 and phase angles 12. The three operating states illustrate operating states that are implemented during the start-up of the electrical machine. In the first operating state in FIG. 2, the main axes 18 of the two elliptical cross sections 14, 15 include a right angle. In the second operating state in FIG. 3, the two elliptical cross sections 14, 15 include an acute angle. In the third operating state in FIG. 4, the main axes of the two elliptical cross sections 14, 15 lay one on top of the other. The third operating state is characterized by virtue of the fact that the vibration of the coil core 3 and the vibration of the coil end comprise essentially the same ellipse inclination and are identical in terms of phase. The third operating state is therefore a critical operating state and is avoided by the method in accordance with the invention by varying the idle power. Critical operating states are also evident if the vibrations of the two coil ends 2 comprise essentially the same ellipse inclination and are identical in terms of phase.

It is preferred that the method in accordance with the invention for operating an electrical machine comprising a stator 1 having a coil of electrical conductors, and the coil comprising two coil ends 2 that lie opposite one another, is implemented as described as follows:

simultaneously determining vibration measurement values by means of twelve measuring points that are uniformly distributed along the circumference of each of the coil ends and in each case are arranged in the same axial position, with which the elliptic vibration modes of the two coil ends 2 can be determined in dependence upon time;

for this purpose simultaneously determining vibration measurement values by means of twelve measuring points that are uniformly distributed along the circumference of the lamination stack and are arranged in the center between the two coil ends 2 with which the elliptic vibration mode of the lamination stack 3 can be determined in dependence upon time;

determining the ellipse inclinations and the phase positions of the elliptic vibration modes of the two coil ends 2 and the lamination stack 3;

determining critical operating states of the electrical machine in which the ellipse inclinations and the phase positions of the elliptic vibration modes of the two coil ends 2 or of the lamination stack 3 and at least one of the coil ends 2 are essentially identical; and operating the electrical machine in such a manner that the critical operating states are avoided by means of varying the idle power of the electrical machine.

Although the invention is further illustrated and described in detail by means of the preferred exemplary embodiment, the invention is not limited by the disclosed examples and other variations can be derived by the person skilled in the art without departing from the scope of the invention.

The invention claimed is:

1. A method for operating an electrical machine which comprises a stator having a coil of electrical conductors, the coil comprising two coil ends that lie opposite one another on the coil;

the method comprising the steps:

simultaneously determining vibration measurement values with which it is possible to determine elliptic vibration modes of the two coil ends in dependence upon time;

also determining ellipse inclinations and phase positions of the elliptic vibration modes of the two coil ends;

also determining critical operating states of the electrical machine at which the elliptic inclinations and the phase positions of the elliptic vibration modes of the two coil ends are essentially identical; and then operating the electrical machine in such that the critical operating states are avoided by varying idle power of the electrical machine so that the ellipse inclinations and the phase positions of the elliptic vibration modes of the two coil ends are not essentially identical.

2. The method as claimed in claim 1, further comprising determining the vibration measurement values of the coil ends at at least eight and at a maximum twelve measuring points that are uniformly distributed along the circumference of each of the coil ends and that are all arranged at the same axial position on their respective coil ends.

3. The method as claimed in claim 1, wherein the stator comprises a lamination stack and the method further comprises the following steps:

determining vibration measurement values selected to enable determining the elliptic vibration mode of the lamination stack in dependence upon time, and simultaneously determining the vibration measurement values, selected to enable determining the elliptic vibration modes of the two coil ends;

determining further critical operating states of the electrical machine in which the ellipse inclinations and the phase positions of the elliptic vibration modes of the lamination stack and at least one of the coil ends are essentially identical; and then operating the electrical machine in such that the further critical operating states are avoided by varying the idle power so that the ellipse inclinations and the phase positions of the elliptic vibration modes of the lamination stack and of the two coil ends are not essentially identical.

4. The method as claimed in claim 3, further comprising:
determining the vibration measurement values of the lamination stack at an axial location in the stator that lies in a center of the coil between the two coil ends.

5. The method as claimed in claim 4, further comprising:
determining the vibration measurement values of the lamination stack at at least eight and at a maximum twelve measuring points that are distributed uniformly along the circumference of the coil ends and that are all arranged at the same axial position on their respective coil ends.

6. The method as claimed in claim 3, further comprising the steps:
determining a pole wheel angle and a phase angle of the electrical machine;
creating a characteristic field in which the critical and the further critical operating states of the electrical machine are plotted in dependence upon the pole wheel angle and the phase angle, and with reference to the characteristic field for avoiding the critical operating states.

7. The method as claimed in claim 1, further comprising determining of the elliptic vibration modes comprises:
transforming the vibration measurement values into a frequency spectrum.

8. The method as claimed in claim 1, wherein the vibration measurement values are displacements, speeds and/or accelerations of the measurement points.

9. The method as claimed in claim 8, further comprising determining the displacements that occur in the radial direction, the speeds that occur in the radial direction and/or the accelerations that occur in the radial direction.

10. The method as claimed in any one of claim 1, further comprising avoiding the critical operating states and/or the further critical operating states by varying the effective power.

11. The method as claimed in claim 3, further comprising determining the vibration measurement values of the lamination stack at at least eight and at a maximum twelve measuring points that are distributed uniformly along the circumference of the coil core and that are all arranged in the same axial position on their respective coil ends.

12. The method as claimed in claim 1, further comprising the determining of the elliptic vibration modes comprises transforming the vibration measurement values into a frequency spectrum.

\* \* \* \* \*